Patented Jan. 15, 1952

2,582,693

UNITED STATES PATENT OFFICE 2,582,693

POLYMERIZATION OF CONJUGATED DIOLEFINS

Anthony H. Gleason, Westfield, N. J., assignor to Standard Oil Development Company, a corporation of Delaware No Drawing. Application January 2, 1947, Serial No. 719,913

4 Claims. (Cl. 260—94.2)

This invention pertains to certain oily or soluble thermoplastic materials and to a method of producing them.

It has been disclosed in application Serial No. 638,589, filed December 31, 1945, by Miller W. Swaney and Anthony H. Gleason, now U. S. Patent 2,513,244, that the cyclic diolefins having a water-like consistency obtained by dimerizing butadiene-1,3 or piperylene can be further polymerized to form oils of high viscosity at ordinary temperatures or soluble, thermoplastic resins of low impact strength by mere heating of these cyclic diolefins or dimers under their own vapor pressure and in the absence of air for from about 10 hours to several days at temperatures of 250–400° C., preferably at temperatures between 290 and 330° C. It was also disclosed therein that since the dimers of butadiene and piperylene are readily formed from the monomers, the latter may be employed directly as the starting material for the resin preparation. When starting with monomeric butadiene-1,3 or piperylene it was proposed that the temperature of the reactor be kept below about 200° C. for a sufficient length of time to allow the concentration of dimer to build up, thus avoiding the creation of excessively high pressures or pressures above about 1000 lbs./sq. in. After 5–6 hours at 150° C. (about 50–60% dimer formation) the temperature could be raised fairly rapidly to 280–300° C. or higher and maintained in this range until the desired polymerization has taken place.

It has now been found that if about 20 to 50 wt. per cent, based on the monomeric diolefin, of certain diluents is added to the butadiene or piperylene feed prior to dimerization the dimerization can be effected without gelation and consequent reactor fouling. In addition to avoiding or minimizing fouling of the dimerization reaction vessel, the process in accordance with the present invention gives greater yields of the desired oily to resinous higher polymers which possess improved properties, particularly solid, thermoplastic resinous products of higher softening point.

The diluents which I have found useful in this process are vinyl cyclohexene or butadiene dimer, cyclic piperylene dimer, certain chlorinated olefins, particularly ethylene dichloride, trichloroethylene, and certain liquid aromatic hydrocarbons, particularly benzene and toluene. I have found that there are a number of diluents which do not prevent gelation and some actually show a tendency to accelerate or increase the amount of gelation. For example, naphtha, 3-methyl pentane, butenes, such as butene-1, and butene-2, cyclohexane and ethyl ether do not prevent gel formation in the dimerization step. The mechanism by which the diluents operate is not clear, the effectiveness being possibly attributable to a solvating action upon the gel or more likely the effective diluents also exert an inhibiting or retarding effect upon gel formation.

An incidental advantage of using dimer or vinyl cyclohexene as diluent in the dimerization step is the fact that it causes a substantial reduction in the total pressure on the reaction system during the early stages of the heating, i. e. at 130–200° C. and, of course, does not require a separation treatment prior to heating to elevated temperatures, i. e. 250–400° C. to form oily to resinous products.

The amount of diluent added initially to the monomeric butadiene or piperylene should be between 20 and 50% by weight based upon the monomer. Greater amounts of diluent are effective but ordinarily it is not economical to use more than 50 wt. per cent of diluent because larger amounts decrease the reactor capacity for dimer formation.

The conversion of monomer to dimer is ordinarily effected in from about 10–15 hours at temperatures below 200° C., preferably at temperatures of about between about 150 and 160° C. After at least a major proportion of the monomer is converted to dimer, the temperature of the reaction system, provided dimer has been used as the diluent, may be raised fairly rapidly to 280–330° C. or higher and maintained at this level until the desired polymerization has taken place. If a diluent other than dimer is used, it is preferable to remove the diluent before heating to a temperature sufficient to cause the formation of oily to resinous polymers. This may readily be done by lowering the pressure on the reaction mixture and venting off the easily volatilizable components. When the reaction mixture is substantially free from diluent, the temperature is increased to temperatures above 250° C. to effect polymerization of the dimer to oily to resinous polymers.

When a diluent is used in accordance with the present invention it is also possible to use supplementary means for assuring elimination of gel formation over a period of several runs. Such supplementary means consists of the addition of certain organic amines such as aniline, methyl aniline, diethyl amine, aqueous ammonia, and organic peroxides such as benzoyl peroxide. The effectiveness of these reagents in preventing gel formation is greatly reduced, if not completely destroyed, if the diluent is omitted.

The following example is illustrative of the present invention:

280 grams of butadiene feed was diluted with ½ its volume of different diluents whereupon the mixture was heated for about 15 hours at 160° C. At the end of this period, the volatile dimers were evaporated and the amount of residue or non-volatile and gelled polymer determined. The results obtained are tabulated below.

| No Gel Formed | Gel Formed | Wt. Percent Based on Butadiene |
|---|---|---|
| Vinyl cyclohexene | Naphtha | 0.30 |
| Benzol | 3 Methyl Pentane | 0.18 |
| Toluene | Butene-2 | 0.20 |
| Trichloroethylene | Ethyl Ether | 0.30 |
| Ethylene dichloride | Cyclohexane | 1.75 |

Although the absolute amount of gel formed is quite small, its fouling effect is greatly aggravated by the voluminous nature of the material. Moreover, since it tends to build up rapidly, very small amounts soon accumulate in the reactor in sufficient amount to destroy its usefulness as a reactor necessitating a shut down and cleaning operation.

The foregoing description contains a limited number of embodiments of the present invention. It will be understood, however, that the invention is not limited to the specific conditions disclosed since numerous variations are possible without departing from the scope of the following claims.

What I claim and desire to secure by Letters Patent is:

1. The process of preparing an oily to resinous polymerization product which consists of mixing a diolefin of the group consisting of butadiene-1,3 and piperylene with from 20 to 50 weight percent, based on the monomeric diolefin, of a diluent selected from the group consisting of the cyclic dimer of butadiene-1,3 and the cyclic dimer of piperylene, heating the resulting mixture at a temperature between 130° and 200° C. until a substantial proportion of the monomeric diolefin is converted to dimer, thereafter heating the total resulting dimerized reaction mixture to a temperature between 250° and 400° C. and maintaining this temperature until an oily to resinous product is obtained.

2. A process according to claim 1 wherein the diolefin is butadiene-1,3 and wherein the diluent is the cyclic dimer of butadiene-1,3.

3. A process according to claim 1 wherein the diolefin is piperylene and wherein the diluent is the cyclic dimer of piperylene.

4. The process of preparing a solid, thermoplastic resin which comprises mixing butadiene-1,3 with from 20 to 50 weight percent, based on the monomeric butadiene of 1-vinyl-3-cyclohexene, heating the resulting mixture at a temperature between about 130° and 160° C. until a substantial proportion of the monomeric butadiene is converted to dimer, thereafter heating the total resulting dimerized reaction mixture to a temperature between 280° and 330° C. and maintaining this temperature until a solid, thermoplastic resin is obtained.

ANTHONY H. GLEASON.

REFERENCES CITED

The following references are of record in the file of this patent:

UNITED STATES PATENTS

| Number | Name | Date |
|---|---|---|
| 2,265,722 | De Nie | Dec. 9, 1941 |
| 2,401,414 | Doumoni et al. | June 4, 1946 |
| 2,513,244 | Swaney et al. | June 27, 1950 |

FOREIGN PATENTS

| Number | Country | Date |
|---|---|---|
| 328,908 | Great Britain | May 1, 1930 |
| 363,348 | Great Britain | Dec. 7, 1931 |